March 10, 1936. E. C. SLOAN 2,033,855
SHAPED FIBROUS SHEET ARTICLES AND METHOD OF PRODUCING THE SAME
Original Filed May 19, 1934
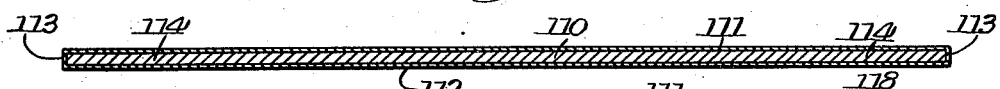
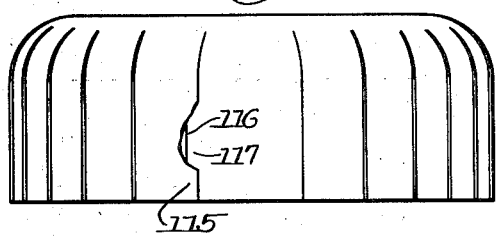
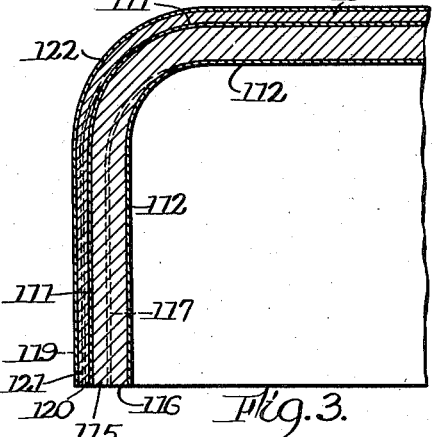
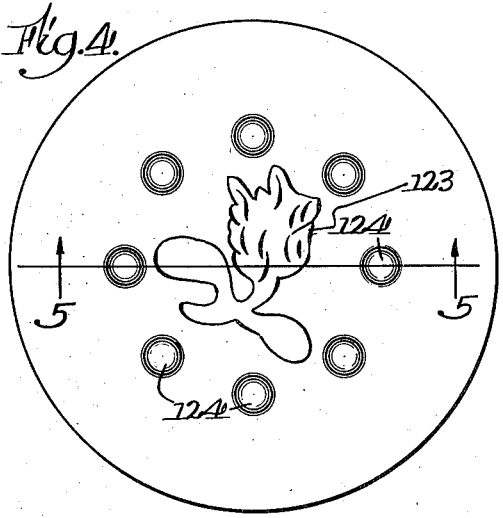
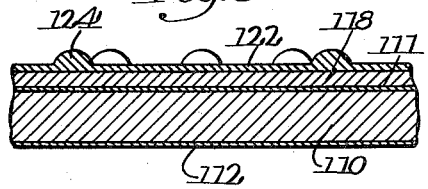
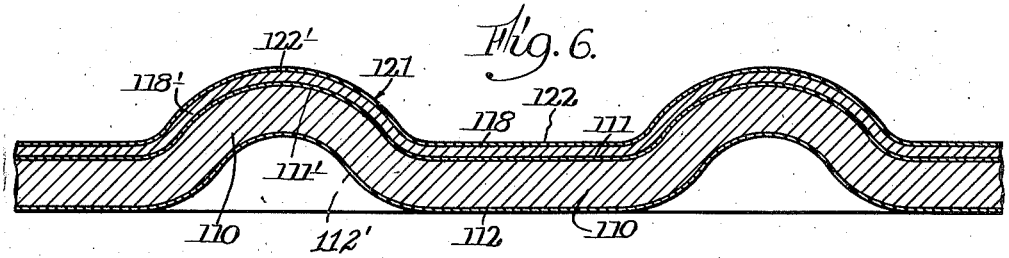
Inventor:
Edward C. Sloan
By: Parkinson & Lane, Atty.

Patented Mar. 10, 1936

2,033,855

UNITED STATES PATENT OFFICE 2,033,855

SHAPED FIBROUS SHEET ARTICLES AND METHOD OF PRODUCING THE SAME

Edward C. Sloan, Geneva, Ill., assignor to Jesse B. Hawley, Geneva, Ill.

Original application May 19, 1934, Serial No. 726,610. Divided and this application May 19, 1934, Serial No. 726,612

10 Claims. (Cl. 18—59)

The present invention relates to the producing of articles the bodies of which are of fibrous material and are so treated with a thermoplastic substance of a resinous base as to present in the produced articles given and desired physical properties and characteristics with or without decorative or artistic effects, and among the objects of the invention is to provide novel articles of the character mentioned above and a novel process of producing the same.

The method or process of this invention generally comprises the treatment of or application to the fibrous material of the article body with or of a thermoplastic substance having the characteristics and properties later more fully described, with or without decorative or ornamental means or media, and subjecting the aggregate to heat and pressure to effect the finished article.

The thermoplastic substance referred to above is in the class of synthetic resinous compounds known as the vinyl resins of the polymerization group and more particularly those which are permanently thermoplastic, characterized by the bond group or radical —CH:CH$_2$, and which are insoluble in most all known solvents, particularly most all hydrocarbon solvents, except the solvents of the ester type or the higher ketones, such as hexone and butyrone. In other words, the substance used in this invention is chemically inert to the extent indicated above and hence is impervious to and proof against moisture, water, acids, alkalies, alcohols, oils, greases, fats and the like. In its normally pure state it is odorless, tasteless, and colorless, that is, transparent. It is also non-inflammable. It may be given any color or made translucent or opaque as desired by the incorporating or mixing therewith of dyes, pigments, fillers, or the like. It is also tough, durable and resilient. It also has a very strong bonding or adhesive property. If a pliant characteristic be desired, a plasticizer may be added to it to the extent of the pliability required. It may be applied in liquid form or in dry sheets, strips, bars, and the like. When applied in the form of a liquid, the article body may be dipped in the liquid or the liquid may be sprayed or brushed on the surface of the article body, and the liquid permitted to dry until all of the volatile solvent has evaporated. Drying may be in the air of normal temperature and humidity known as "air dried" or may be in a dry heated fluid such as hot air or gas or the like known as "force dried".

When using the liquid form, the solvent preferably used is acetone but it is to be understood that other solvents as mentioned above may be used without affecting the idea of invention herein disclosed. The body of the article produced preferably is of fibrous material, such as manila paper or board, cardboard, pasteboard, paper, and the like.

The body of the article preferably is made by the shaping, as by pressure or otherwise, of a piece or sheet of the fibrous material, and applying to the surface of the body the thermoplastic substance mentioned above to form any desired effect with or without coloring, decoration and the like as above stated.

Other objects, capabilities, advantages and the like are comprehended by the invention as will later appear and as are inherently possessed by the invention.

This application is a division of my co-pending application identified as Serial No. 726,610, filed May 19, 1934.

Referring to the drawing:

Fig. 1 is a sectional view of a sheet or disc of fibrous material before shaping it to form a flanged article, such as a cover or cap as shown in Fig. 2;

Fig. 2 is a view in elevation of a pressed and shaped cover or cap showing the folds of the edge portion or flange;

Fig. 3 is a part sectional view of the cover or cap shown in Fig. 2 with coatings or coverings, veneer or decoration, or the like;

Fig. 4 is a top plan view of an article, such as a cover or cap, or plate, or the like, having bosses or cameo impressions or intaglio;

Fig. 5 is a fragmentary section taken in a plane represented by line 5—5 in Fig. 4; and, Fig. 6 is a section similar to Fig. 5 but showing pressed bosses or reliefs.

Referring more in detail to the drawing the invention is illustrated in a few forms of the article. The article shown is formed or shaped from sheets of fibrous material such as manila sheet or paper or the like, cardboard, paste board, fibre sheet, fibre board, and the like, which has sufficient compliance to be formed, shaped or strained by suitable means. To illustrate, a sheet 110, (Fig. 1) may be provided with layers or coatings 111, 112, and 113 on both surfaces and at the edges thereof. The sheet may then be placed in a suitable die press or the like to shape it into the form of a cup or cap so that the marginal portion 114 of the sheet will be formed into folds having laps 115 and 116 (Fig. 2) with portions of the layers 111 and 112 of the thermoplastic substance between the laps to unite and form them together when the article is later subjected to heat and pressure. As shown in Figs. 2 and 3 the cup or cap has a series of overlaps 115 and underlaps 116 with intervening layers 117 of the thermoplastic substance, a part being shown broken away in Fig. 2 to show the lapping feature and the layer 117 on an underlap. In the finished article, the parts 115 and 116 are compressed to be of the same thickness as the remainder of the body of the article. If the formed article or blank be not coated or provided with a layer of thermoplastic substance before shaping the normally flat sheet, the coatings or layers 111, 112, 113, and 117 may be applied afterwards in any of the ways described above. The outer layer if desired, may include any color producing substance or matter such as a dye or pigment or filler to give the color effect desired.

If a decorative effect is desired, the decorative means may be applied to the surface of the layer 111 and it may be wood veneer, or a textile sheet with design, or lace, or paper with design, or a picture, or the like. Such a decorative piece 118 is shown in section in Fig. 3. Over the flange part of the body, this decorative piece may have folds having laps 119 and 120 with an intervening layer 121 of the thermoplastic substance. Over the outer surface may be a covering or layer 122 of the thermoplastic substance. If wood veneer be used, the marginal portion may be slitted so as to provide tongues which may overlap or abut on the flange, and which may be so compressed, when the article is subjected to the heat and pressure of the hot dies, as to appear to be of a single thickness and a single sheet. If desired a design piece 123 (Fig. 4) may be included in the outer layer 122.

As stated above, the thermoplastic substance may be used in sheet form by simply applying the sheet to the surface to be coated or covered, or it may be used in liquid form. The liquid form of the thermoplastic substance may be applied by dipping the body of the article in the solution or by spraying the liquid on the surface, or by applying it with a brush. As the volatile solvent evaporates the liquid thickens and even becomes tacky. Air drying may be used but if desired the coating may be dried more quickly in heated air or the like. When the spraying method is used, it is preferable to use some of the higher volatiles mentioned above so that the evaporating of the volatile solvent may be slower. It is preferable to air dry first to obtain a removal of the major portion of the volatile solvents and then force dry, in heated air or the like, to remove the residual volatiles. The complete evaporation of the volatiles is to avoid the formation of bubbles or the like, so that when heat and pressure are later applied there will be no bubbles or the like to be trapped and thus form blemishes, defects, flaws or the like, in the covering of the finished article.

After the article has been shaped as desired and has been covered or coated with the thermoplastic substance, the next step is to heat and press the covered article so as to mold the thermoplastic substance. If it be desired to obtain a glossy or lustrous surface for the coating, the dies have polished surfaces. If a satin finsh be desired, the surfaces of the dies are left with a satin-like finish. If an embossed or like finish be desired, the die surfaces may be provided with the proper contour to mold the type of surface desired.

The dies are heated to the necessary temperature to fuse and melt the thermoplastic substance so that it will be sufficiently plastic or fluidal to be displaced or to flow to assume an exact counterpart of the surfaces of the dies. The dies are applied to the article with sufficient pressure to effect this result and also to press or compress the layers, such as the folds of the fibrous material and of the decorative element, if one be used, such as the overlaps and underlaps shown in the drawing, whereby the folds will present a surface which will be substantially flush or even and the article will appear to be made of a single thickness. Moreover, the thermoplastic substance will enter or penetrate into the interstices of the fibrous material to a greater or lesser extent depending upon the amount of the thermoplastic substance used, and if desired the fibrous material may be entirely impregnated or permeated with the thermoplastic substance but in most cases it is only necessary to impregnate the surface portion of the article body itself.

After the necessary heat and pressure have been applied, the casting, that is, the article and the die molded thermoplastic substance, is allowed to cool while being maintained under pressure in the dies, the latter also being cooled. The dies may then be removed. The finished article has a glossy or lustrous coating or surface if the die surfaces have been polished, or has the particular contour produced by the contoured surface of the dies if such be used. The coating acts as a stiffener and reinforcer for the body portion of the article; also as a strong bond or adhesive for maintaining the parts together in the relations assumed when subjected to pressure and heat; also as a protecting and preserving means preventing the access of moisture and other deteriorating media, etc. to the material of the article, and the like, and also as an adorning or embellishing means to give the article an appearance of elegance, and the like. When a decorative element is used, the pressure of the dies will press it into the material of the body portion of the article so that the surface of the decorative element will be substantially even or flush with the surface of the body. A portion of the coating or covering will enter the interstices of the material of the body, and of the decorative element, if any be used, or may wholly impregnate or permeate the material of the body and the decorative element, so that when the coating or covering material is cooled, the whole article will be strong, stiff, solid, and practically an integral unit. In this way an article having the appearance and properties of difficultly made and costly substances, such as stone, crockery, ceramic ware, valuable woods, metals, etc., may be made quickly and easily from inexpensive materials, and the article will be lighter in weight and fully as strong. If it be desired to give weight to the article, the fibrous material may be loaded with weight giving material before applying the thermoplastic substance.

If the die surfaces are provided with depressions or the like, the thermoplastic substance will fill them and when the article and dies are cooled and the die removed, the article will have bosses or cameo elements 124, these elements being an integral part of the layers 122 as shown in Fig. 5. These elements may be of any desired shape, such as lines, ribs, etc. If some coloring substance or matter or some of the pigmented thermoplastic substance be first placed in the depressions in the die surfaces, the thermoplastic substance covering the article will unite therewith and the molded elements 124 will be colored according to the dye or pigment used. If intaglio effects should be desired, the surface of the die may have raised portions so that intaglio depressions will be molded in the surface of the layer 122.

Bosses or cameo elements may also be produced by the displacement of part of the material of the articles such as is shown in Fig. 6, in which case the die surface is provided with bosses or similar projections which, when the dies are pressed against the assembly, form displaced portions 121 of all strata of the article including the inner, intervening and outer layers 112, 111, and 118 of the thermoplastic material and the body layer 110 and the veneer or decorative sheet 118 to form corresponding contoured portions 112', 111', 122', 110', and 118' as shown in Fig. 6.

The heat and pressure of the dies cause the thermoplastic substance to fuse and become fluidal to conform to the contour of the die surfaces, the pressure acting also to shape the assembly by compression or displacement or both of the parts, and the thermoplastic substance enters the interstices of the strata or sheets 110 and 118 to form, on cooling, a practically integral rigid unit.

When convenient instead of deriving all the heat from the dies to produce the desired effect, the assembly of parts may be heated in any suitable manner, not sufficient to cause the thermoplastic material to prematurely fuse or become plastic before the dies are applied. In such case the dies will not need to be heated as much as when all of the heat necessary for the desired effect must be supplied wholly from the dies. In that way a more thorough and quicker thermoplastic action is effected, and the time of cooling is decreased. Less heat is necessary in the dies and hence the dies cool more quickly.

While I have disclosed a few embodiments of the invention and a mode of producing them it is to be understood that the invention is not limited thereto but comprehends other constructions, details, arrangements of parts, features and process steps without departing from the spirit of the invention.

Having thus disclosed the invention, I claim:

1. A process of making articles comprising shaping a sheet of fibrous material into a given form to form the body of the article, applying a decorative element to the surface of said body, covering the surface of said body and said decorative element with a thermoplastic substance of a resinous base, subjecting the assembly to heat and pressure to fuse said substance to unite said body and decorative element and to provide a covering therefor, cooling the same to solidify the substance with a given surface and to produce a rigid unit, and removing the pressure.

2. A process of making articles comprising shaping a sheet of fibrous material into a given form to form the body of the article, covering the surface of said body with a thermoplastic substance of a resinous base, covering the same with a veneer, applying a decorative element to the veneer, covering the assembly with said substance, subjecting the assembly to heat and pressure to fuse said substance to unite said body, veneer and element and to provide a covering therefor, cooling the same to solidify the substance with a given surface and to produce a rigid unit, and removing the pressure.

3. A process of making articles comprising shaping a sheet of fibrous material into a given form to form the body of the article, covering the surface of said body with a thermoplastic substance of a resinous base, subjecting the assembly to heat and pressure to cause the substance to unite with said body and provide a covering therefor, molding a portion of said substance to form a decorative contoured element therefrom, cooling the same while under pressure to solidify said substance with a given surface and with said element integral therewith, and removing the pressure.

4. A process of making articles comprising shaping a sheet of fibrous material into a given form to form the body of the article, covering the surface of said body with a thermoplastic substances of a resinuous base, subjecting the assembly to heat and pressure to cause the substance to unite with said body and provide a covering therefor and to compress over thick parts of the body to substantially the same thickness as the remainder of the body, cooling the assembly while under pressure to solidify said substance with a given surface, and removing the pressure.

5. An article comprising a shaped body of fibrous sheet material, and a covering of a solidified thermoplastic vinyl resin of the bond group —CH:CH$_2$ united to said body to form a rigid unit.

6. An article comprising a shaped body of fibrous sheet material, a decorative covering for said body, and a covering of a solidified thermoplastic vinyl resin of the polymerization group united to and uniting said body and decorative covering to form a rigid unit.

7. An article comprising a shaped body of fibrous sheet material, a covering of a solidified thermoplastic vinyl resin of the bond group —CH:CH$_2$ united to said body, a veneer covering said covered body, and a covering of said solidified substance united to and uniting said veneer and said body to form a rigid unit.

8. An article comprising a shaped body of fibrous sheet material, a covering of a solidified thermoplastic vinyl resin of the bond group CH:CH$_2$ united to said body to form a rigid unit, a veneer covering said covered body, a decorative element on said veneer, and a covering of said solidified substance united to and uniting said body, veneer and decorative element to form a rigid unit.

9. An article comprising a shaped body of fibrous sheet material, a covering of a solidified thermoplastic vinyl resin of the polymerization group united to said body to form a rigid unit, said covering having an integral portion thereof in the form of a decorative element.

10. An article comprising a shaped body of fibrous sheet material, a decorative covering for said body, and a covering of a solidified thermoplastic vinyl resin of the bond group CH:CH$_2$ united to and uniting said body and decorative covering to form a rigid unit, a part of said body and covering being displaced to form a decorative element for the article.

EDWARD C. SLOAN.